United States Patent
Clawson

(10) Patent No.: US 7,062,915 B2
(45) Date of Patent: *Jun. 20, 2006

(54) HIGH-EFFICIENCY OTTO CYCLE ENGINE WITH POWER GENERATING EXPANDER

(76) Inventor: Lawrence G. Clawson, 7 Rocky Brook Rd., Dover, MA (US) 02030

( * ) Notice: Subject to any disclaimer, the term of this patent is extended or adjusted under 35 U.S.C. 154(b) by 0 days.

This patent is subject to a terminal disclaimer.

(21) Appl. No.: 10/988,960

(22) Filed: Nov. 15, 2004

(65) Prior Publication Data

US 2005/0217268 A1    Oct. 6, 2005

Related U.S. Application Data

(63) Continuation of application No. 10/309,779, filed on Dec. 4, 2002, now Pat. No. 6,817,182.

(60) Provisional application No. 60/338,637, filed on Dec. 5, 2001.

(51) Int. Cl.
  *F02B 47/02*  (2006.01)
  *F02M 25/022*  (2006.01)

(52) U.S. Cl. .................... 60/670; 60/39.511; 60/39.53; 60/605.1; 60/653; 60/676; 60/698; 60/775; 123/258; 123/25 P

(58) Field of Classification Search ............ 60/39.511, 60/39.53, 653, 670, 673, 674, 676, 681, 775, 60/605.1, 698; 123/25 P, 25 B, 25 D
See application file for complete search history.

(56) References Cited

U.S. PATENT DOCUMENTS

| | | | |
|---|---|---|---|
| 2,678,531 A * | 5/1954 | Miller | 60/775 |
| 3,554,174 A | 1/1971 | Clawson | |
| 3,788,066 A * | 1/1974 | Nebgen | 60/775 |
| 3,976,507 A | 8/1976 | Bloomfield | |
| 3,982,962 A | 9/1976 | Bloomfield | |
| 4,004,947 A | 1/1977 | Bloomfield | |
| 4,046,119 A | 9/1977 | Perry | |
| 4,128,700 A | 12/1978 | Sederquist | |
| 4,145,888 A | 3/1979 | Roberts | |
| 4,166,435 A | 9/1979 | Kiang | |

(Continued)

FOREIGN PATENT DOCUMENTS

CH        581 784        9/1976

(Continued)

OTHER PUBLICATIONS

*Fuel Cell Handbook*, 5th pp. 9-37-9-38 by USDOE/NETL (Nat'l Energy Tech. Lab) (Oct. 2000).

(Continued)

*Primary Examiner*—Sheldon J Richter
(74) *Attorney, Agent, or Firm*—Hamilton, Brook, Smith & Reynolds, P.C.

(57) ABSTRACT

High-efficiency combustion engines, including Otto cycle engines, use a steam-diluted fuel charge at elevated pressure. Air is compressed, and water is evaporated into the compressed air via the partial pressure effect using waste heat from the engine. The resultant pressurized air-steam mixture then burned in the engine with fuel, preferably containing hydrogen to maintain flame front propagation. The high-pressure, steam-laden engine exhaust is used to drive an expander to provide additional mechanical power. The exhaust can also be used to reform fuel to provide hydrogen for the engine combustion. The engine advantageously uses the partial pressure effect to convert low-grade waste heat from engine into useful mechanical power. The engine is capable of high efficiencies (e.g. >50%), with minimal emissions.

32 Claims, 2 Drawing Sheets

U.S. PATENT DOCUMENTS

| | | | |
|---|---|---|---|
| 4,208,989 A | 6/1980 | Hart | |
| 4,365,006 A | 12/1982 | Baker | |
| 4,473,622 A | 9/1984 | Chludzinski et al. | |
| 4,479,907 A | 10/1984 | Ogura | |
| 4,492,085 A * | 1/1985 | Stahl et al. | 60/674 |
| 4,557,222 A | 12/1985 | Nelson | |
| 4,622,275 A | 11/1986 | Noguchi et al. | |
| 4,644,751 A | 2/1987 | Hsu | |
| 4,681,701 A * | 7/1987 | Sie | 252/373 |
| 4,696,871 A * | 9/1987 | Pinto | 429/17 |
| 4,735,186 A | 4/1988 | Parsons | |
| 4,738,903 A | 4/1988 | Garow et al. | |
| 4,913,098 A | 4/1990 | Battaglini | |
| 4,994,331 A | 2/1991 | Cohen | |
| 5,002,481 A | 3/1991 | Förster | |
| 5,010,726 A * | 4/1991 | Garland | 60/775 |
| 5,034,287 A | 7/1991 | Kunz | |
| 5,335,628 A | 8/1994 | Dunbar | |
| 5,360,679 A | 11/1994 | Buswell et al. | |
| 5,449,568 A | 9/1995 | Micheli et al. | |
| 5,501,781 A | 3/1996 | Hsu et al. | |
| 5,595,059 A | 1/1997 | Huber et al. | |
| 5,624,964 A | 4/1997 | Cimini et al. | |
| 5,645,950 A | 7/1997 | Benz et al. | |
| 5,693,201 A | 12/1997 | Hsu et al. | |
| 5,758,606 A | 6/1998 | Rosen et al. | |
| 5,811,201 A | 9/1998 | Skowronski | |
| 5,873,236 A | 2/1999 | Koyama et al. | |
| 5,893,423 A | 4/1999 | Selfors et al. | |
| 5,896,738 A | 4/1999 | Yang et al. | |
| 5,948,221 A | 9/1999 | Hsu | |
| 5,976,332 A | 11/1999 | Hsu et al. | |
| 5,976,722 A | 11/1999 | Müller et al. | |
| 5,981,096 A | 11/1999 | Hornburg et al. | |
| 5,985,474 A | 11/1999 | Chen et al. | |
| 5,993,984 A | 11/1999 | Matsumura et al. | |
| 5,998,885 A | 12/1999 | Tamor et al. | |
| 6,001,499 A | 12/1999 | Grot et al. | |
| 6,077,620 A | 6/2000 | Pettit | |
| 6,085,512 A | 7/2000 | Agee et al. | |
| 6,106,963 A | 8/2000 | Nitta et al. | |
| 6,120,923 A | 9/2000 | Van Dine et al. | |
| 6,130,259 A | 10/2000 | Waycuilis | |
| 6,190,791 B1 | 2/2001 | Hornburg | |
| 6,196,165 B1 | 3/2001 | Rosen et al. | |
| 6,213,234 B1 | 4/2001 | Rosen et al. | |
| 6,233,940 B1 * | 5/2001 | Uji | 60/653 |
| 6,260,348 B1 | 7/2001 | Sugishita et al. | |
| 6,289,666 B1 * | 9/2001 | Ginter | 60/775 |
| 6,316,134 B1 | 11/2001 | Cownden et al. | |
| 6,347,605 B1 * | 2/2002 | Wettergard | 123/25 B |
| 6,365,289 B1 | 4/2002 | Lee et al. | |
| 6,365,290 B1 | 4/2002 | Ghezel-Ayagh et al. | |
| 6,817,182 B1 * | 11/2004 | Clawson | 60/670 |
| 2002/0004152 A1 | 1/2002 | Clawson et al. | |
| 2002/0163200 A1 | 11/2002 | Oglesby et al. | |

FOREIGN PATENT DOCUMENTS

| | | |
|---|---|---|
| DE | 19755116 C1 | 3/1999 |
| EP | 0 920 064 A1 | 6/1999 |
| EP | 1 104 039 A2 | 5/2001 |
| EP | 1 143 199 A1 | 10/2001 |
| GB | 1 428 929 | 3/1976 |
| JP | 58-005975 | 1/1983 |
| JP | 58-165273 | 9/1983 |
| JP | 60-051604 | 3/1985 |
| JP | 2000-200617 | 7/2000 |
| WO | WO 01/25140 | 4/2001 |
| WO | WO 01/95409 A2 | 12/2001 |

OTHER PUBLICATIONS

*Fuel Cell Handbook*, 5$^{th}$ pp. 9-58-9-70 by USDOE/NETL (Nat'l Energy Tech. Lab) (Oct. 2000).

* cited by examiner

HIGH-EFFICIENCY OTTO CYCLE ENGINE WITH POWER GENERATING EXPANDER

RELATED APPLICATIONS

This application is a continuation of U.S. application Ser. No. 10/309,779, filed Dec. 4, 2002 now U.S. Pat. No. 6,817,182, which claims the benefit of U.S. Provisional Application No. 60/338,637, filed Dec. 5, 2001. The entire teachings of the above applications are incorporated herein by reference.

BACKGROUND OF THE INVENTION

The burning of fuel to produce energy, and particularly mechanical energy, is at the root of modern society. Improvement in the efficiency of such combustion, or in reduction of the emissions created by combustion, are therefore important. A variety of prime movers or engine types are currently in use. The most widespread of these are the internal combustion engine and the turbine.

The internal combustion engine, especially the spark-fired "Otto cycle" engine, is particularly ubiquitous, but presents significant challenges in the further improvement of its efficiency. The reciprocating piston Otto cycle engine is in principle extremely efficient. For example, an Otto cycle engine operating with a 10:1 compression ratio, constant volume TDC, no heat loss, and at constant specific heat ratio (K) should, in theory, have about a 60% cycle efficiency. However in actual practice, engines typically operate at about half these air cycle values (i.e. about 31–32% efficiency). This is due to a number of reasons, including the fact that as the fuel burns, raising air temperature, the combustion chemistry limits peak temperature through dissociation and specific heat increase. Also, heat loss, finite burning, and exhaust time requirements reduce efficiency to about 85% theoretical fuel-air cycle values. Finally, engine friction, parasitic losses, etc., reduce actual power output by another 15% or so in a naturally aspirated engine.

It is well-known that it would be more efficient to run such an engine leaner—i.e., at a higher stiochiometric ratio of oxygen to fuel—to improve efficiency and reduce NOx (nitrogen oxide) emission. However, lean burning makes it difficult to sustain flame-speed (and thus avoid misfire) in a conventional Otto cycle engine, which limits the effectiveness of this approach. This problem could be overcome to some extent by "supercharging" the engine—i.e. running it at an inlet pressure significantly above atmospheric pressure—but then the problem of premature detonation must be avoided, which limits the maximum available compression ratio, and thereby decreases the efficiency.

Moreover, each improvement in compression and leanness tends to increase the creation of NOx at a given peak temperature, which must then be removed by parasitic devices, such as exhaust emission systems. Further, the exhaust emission catalysts tend to be made inefficient, or poisoned entirely, by excess oxygen.

SUMMARY OF THE INVENTION

It has been discovered that the methods described herein can be used to increase the efficiency of energy producing systems, particularly engines, and more particularly the Otto cycle engine. The modifications to present practice to achieve the improved process are relatively straightforward and easily implemented, and produce significant and synergistic effects when used in combination.

In one embodiment, a combustion engine power system comprises a combustion chamber which burns a fuel with a pressurized mixture of steam and air to produce useful power, waste heat, and a steam-containing exhaust stream; a compressor which pressurizes air to produce a pressurized air stream; a water supply containing water that is heated by waste heat from the power system and evaporated into the pressurized air stream to produce the pressurized mixture of air and steam; a expander which is driven by the steam-containing exhaust stream to produce a power output in excess of the power required to pressurize the air; and a power take-off of the excess power from the expander. In one aspect, the present power generating system in effect superimposes a Rankine or steam cycle power addition onto a conventional turbo-compressor bottoming recuperation cycle. The steam cycle uses waste heat from the engine while simultaneously diluting the working fluid (e.g. air) of the engine. This combination of the cycles (the "joint cycle") improves cycle efficiency, suppresses detonation via steam dilution, and increases engine specific power. In certain embodiments, the power system uses hydrogen to support flame propagation of the steam-diluted fuel-air mixture, and the hydrogen may be advantageously provided by reforming a fuel using the high thermal mass steam-laden engine exhaust.

According to one aspect, the Otto cycle power system of the present invention operates with a steam-diluted fuel-air charge at an elevated pressure. The working fluid of the engine (e.g. air) is compressed to a high-pressure by a compressor. The preferred pressure is in the range of about 2 to about 6 atmospheres, including pressures within this range such as 2 to 3, 3 to 4, 4 to 5, and 5 to 6 atm. One embodiment described herein uses a 4 atm pressurized air stream (1 atm=1 bar; 1 bar is approximately 0.1 megapascal (MPa)).

Then, waste heat from the power system (such as from the engine exhaust or the engine cooling system) is used to evaporate water into the pressurized air to produce a pressurized mixture of air and steam. This may be efficiently done by partial pressure boiling of water (warmed by waste heat of the engine) in the presence of the pressurized air stream at one or several locations in the system.

The pressurized steam-air mixture is then inducted into the combustion chamber of the engine, together with an appropriate amount of fuel, where they are combusted in the conventional fashion (i.e. two cycle or preferably four cycle for maximum efficiency). The water (i.e. steam) concentration in the inlet stream of the combustion chamber should be as high as practical. In a 4 atm system, this can be about 8 moles of water per mole of methane (or equivalent in gasoline).

One advantage in using a steam-diluted fuel-air mixture is a reduction in peak cycle temperature, which has the effect of improving cycle efficiency while also reducing NOx emissions. Another important advantage of operating dilute is the tremendous detonation suppression resulting from the added steam. This makes it possible to operate the engine at high pressures (e.g. 4 atm). This turbocharging of the engine inlet not only aids in burning speed, but also provides the means for hybrid power/efficiency gains, and increases engine output and mechanical efficiency well over that of the natural aspired stoichiometrically correct standard engine practice.

Where the addition of steam diluent hampers the ability of the fuel mixture to burn in the engine, any conventional means for igniting a dilute fuel-air mixture may be employed. In one embodiment, the primary fuel injected into the combustion chamber is supplemented by the addition of a second fuel, such as hydrogen, to help sustain flame-front propagation in the steam-diluted mixture. Moreover, by turbocharging the engine, the resultant high-temperature and high-pressure exhaust can be advantageously used as a source of heat and/or steam to partially reform the primary fuel to provide a source of the supplemental fuel (e.g. hydrogen). Because the exhaust contains a substantial amount of steam, the exhaust itself can provide steam required for the reforming reaction. Alternatively, or in addition, steam from elsewhere in the system, such as a dedicated boiler, can be used.

The combustion in one or more combustion chambers (or cylinders) provides the primary output power of the system, and is typically used directly for mechanical work, or indirectly for electricity generation. The engine combustion also generates waste heat, some of which is contained in the high-temperature engine exhaust, and some of which is removed from the engine via a cooling fluid which circulates through the engine. Much of this waste heat, such as heat from the engine cooling loop and heat from low-temperature exhaust, is low-grade heat that is notoriously difficult to recapture in a useful manner. Consequently, in a conventional engine, this low-temperature waste heat is typically rejected from the engine.

In the present invention, however, at least a portion of this low-temperature waste heat is advantageously recaptured by using the energy of the waste heat to evaporate water into the pressurized engine oxidant (e.g. air) to produce a pressurized steam-air stream having a significant expansion potential. This expansion potential can be used to produce additional mechanical energy, and thereby improve engine efficiency, as described below. In general, as much warm water should be evaporated to recover its latent heat as can be accommodated by the pressurized air. The proportion of the latent heat that is recovered as steam depends on the type of system and on its details. A proportion of at least about 50% is desirable, and generally obtainable. With a typical Otto cycle engine, recovery in the range of about 50% to 75% is often obtainable. Recoveries significantly below 50%, for example below about 25%, while still beneficial in terms of efficiency, may not be sufficient to justify the extra cost in constructing the system of the invention.

After combustion, the exhaust stream from the combustion chamber is at a high-temperature (e.g. 2100°Rankin, or about 1200°K.) and is still at the elevated system pressure (e.g. 4 atm). The exhaust is loaded with steam, and has a substantial expansion potential that can be advantageously utilized to drive an expander, (preferably a turbine but not limited thereto) to produce a power output. A power take-off from the expander can be utilized, for example, to drive an electrical generator, or to gear the expander power output into the primary power output from the engine. The expander can also be coupled to and used to directly drive the air-input compressor.

In contrast to conventional turbo-compressor (Brayton) cycle engines, the present invention is able to generate significant excess power by the expansion of steam-laden engine exhaust. The steam provides an additional mass flow through the expander, for example, twice the "specific mass flow" (i.e. specific-heat adjusted mass flow) of the air alone. In effect, the present invention adds a Rankine, or steam cycle, power addition to the conventional turbo-compressor bottoming recuperation cycle. Thus, instead of simply recouping the power expended in compressing the air, the "joint" Brayton/Rankine cycle of the present invention is able to generate significant additional power. In a 4 atm. system, for example, the expander can produce over three times, and in some cases over four times, the power that is required to drive the compressor. This excess power can be significant in terms of overall system efficiency, and can amount to a 33% increase in net power output of the system as a whole.

Moreover, this excess power of the turbine can be obtained at little or no cost, as it is derived from the recovery of low temperature "waste" heat via evaporation of warm water into pressurized air (i.e. the "partial pressure effect"). The energy gained is essentially the latent heat consumed to vaporize water. The latent heat is a significant quantity: it takes about 2326 joules per gram to evaporate water at 60° C., while it takes only about an additional 1465 joules per gram to heat the evaporated water (steam) by an additional 800° C. The sequence of pressurization of air before evaporation of water is important in order to maximize efficiency improvements, because while significant energy is expended to compress the air, very little energy is required to compress the warm water to the same pressure.

A typical range of concentration of steam in the system exhaust is in the range of about 30 to 60% by weight, preferably in the range of about 30% to 50% by weight, and even more preferably in the range of about 33% to 45% by weight (for example, about 520 lbs of steam in 720 lbs of air, or about 40%). A lower end of the range is typically about 20 to 25%, which is both the general range in which the presence of steam in the pressurized fuel-air mixture begins to require the presence of hydrogen (or similar means) for reliable ignition, and about the lower limit at which the extra complexity of the "joint cycle" engine is repaid by improvements in efficiency. Steam concentrations above 50% are desirable when they can be readily obtained. At very high levels of steam, such as about 75% by weight and above, the combustion of the fuel-steam-air mixture can become more difficult, and the loss in power becomes a limiting factor on maximum percent of steam incorporated, with the precise limit depending on the details of the system design.

After expansion, the expanded and cooled exhaust can next be used to provide heat to evaporate or preheat water. When sufficiently cool, it is passed through a condensing radiator to condense water. The recovered water is then recycled to provide water for making steam. The condensing radiator is optionally combined with the radiator used for cooling the engine, after the engine cooling fluid has likewise been used to evaporate or preheat water. Stoichiometric operation of the engine maximizes the condensing exhaust dewpoint. In order to maintain sufficient water recovery levels in varying ambient temperatures and climatic conditions, the exhaust dewpoint can be adjusted by selectively applying a backpressure to the exhaust (e.g. via a flow-restricting variable valve) as needed.

According to one aspect, heat from the high-temperature engine exhaust can be used to partially reform gasoline or other fuel, preferably in the presence of steam, to produce a mixture of hydrogen and combustible carbon-containing materials. Heat required for the reforming reaction is preferably provided by heat exchange with the highest temperature exhaust gases (i.e. immediately or soon after the exhaust leaves the combustion chamber). Steam, if required for the reforming process, may be obtained by injecting steam from a steam source, or by using a portion of the steam-laden exhaust itself as a steam source. Optionally, oxygen can be injected at this stage as well. When the steam-laden exhaust itself is used for the reforming, the portion of the exhaust required will vary according to the exact design and could be in the range of about 35% to about 5%, depending on the steam content of the exhaust. About 10% is optimal for the 4 atm. supercharge.

In one embodiment, the steam for the fuel reforming reaction can be made by boiling water using heat from the exhaust at a cooler portion of the exhaust stream (e.g. below the expander). Even after the exhaust stream is expanded and cooled by the expander, there is still enough heat remaining to boil some steam undiluted at atmospheric pressure. This steam, along with the fuel to be reformed, can then be supplied to a reforming zone that is heated by the high-temperature exhaust (i.e. before expansion) to support the endothermic fuel reforming reaction.

The hydrogen-containing reformate generated from the exhaust can be advantageously supplied to the combustion chamber by passing all of the fuel through the reformer, without necessarily reforming all of the fuel completely. Alternatively, a reformate can be used as a supplement to the primary fuel source, which generally comprises partially reformed and/or unreformed fuel. The presence of the hydrogen in the fuel mixture allows sufficient flame speed to support the lean, dilute combustion described above. It may be less important to supply a hydrogen fuel charge for other types of combustion. Reforming the fuel by steam reforming (reaction of fuel with water to produce hydrogen and other products) including variant forms of autothermal reforming (ATR) and partial oxidation (POx) is preferred. Formation of hydrogen by simple heating of fuel ("cracking") is known, and is also useable in the invention wherever the tendency to produce carbon deposits can be controlled. In principle, a store of pure hydrogen or of hydrogen mixed with another gas could also be used, although it would be less practical in most applications.

The systems and methods described herein can advantageously be used to provide a combustion engine characterized by high-efficiency and low emissions. For example, employing the principles of the present invention, a standard off-the-shelf Otto-cycle engine can perform at increased specific power with a nominal 52% efficiency, while at the same time having only trace emissions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
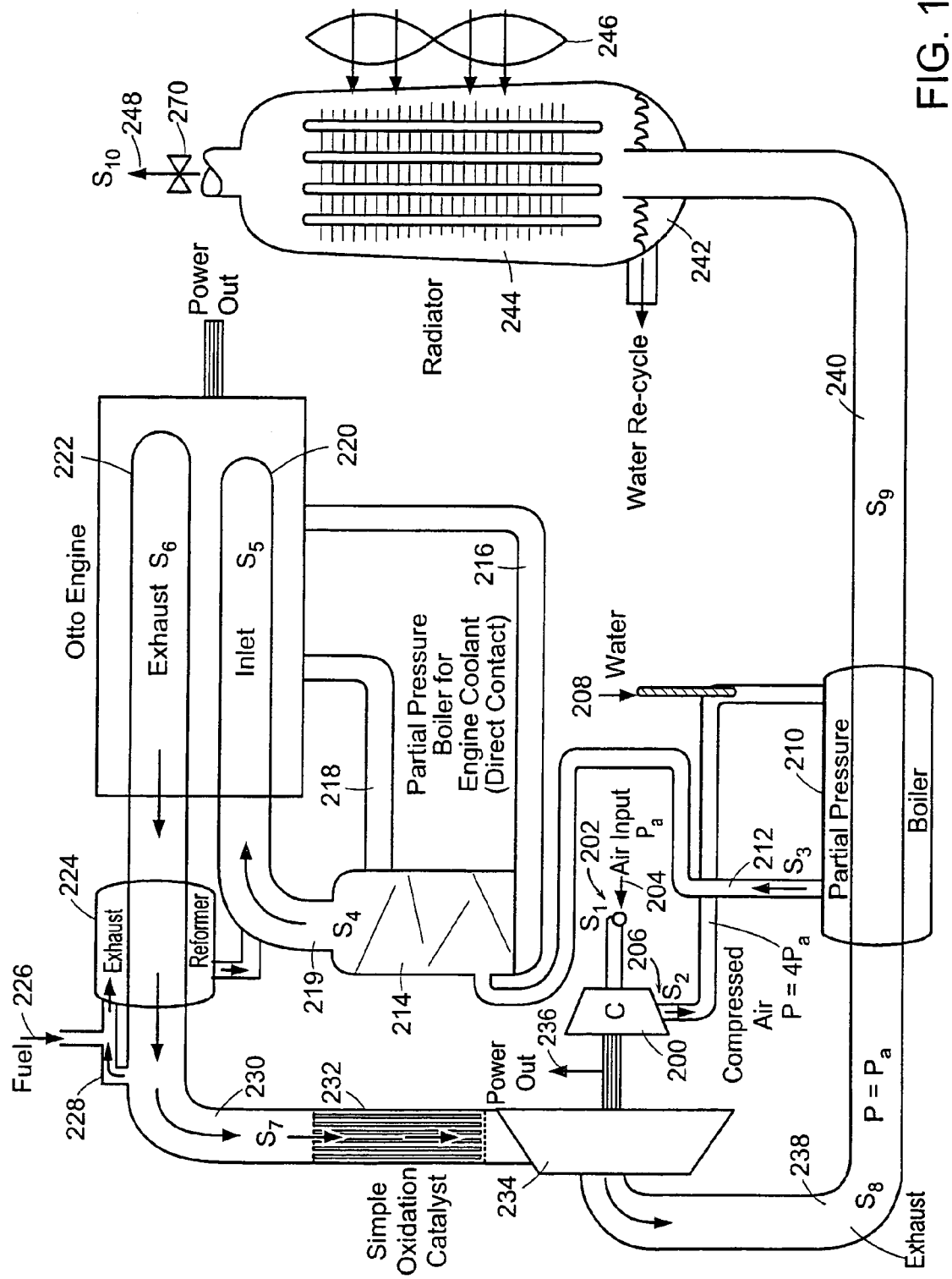
FIG. 1 is a schematic of an Otto cycle engine system according to one embodiment of the invention.

Referring to the schematic illustration of FIG. 1, it will be more clearly understood how the combination of steam generation, hydrogen generation, stoichiometric air combustion, and elevated dew point water recycle synergistically work together in an engine of the invention. The turbocharger compounded engine of this example uses exhaust reforming and steam generation via the partial pressure effect from the waste heat temperature sinks of the engine. The latent energy of this waste heat is transferred to the pressurized air of the engine, where it can be used for power generation. The following example contains specific amounts of inputs and values of variables (temperature, pressure, etc) in order to provide an example of the efficiency improvement possible with the present invention. These specific examples are not to be taken as limiting the scope of the invention.

As shown in FIG. 1, the Otto cycle engine includes a compressor 200, which is preferably a two-stage compressor. At State 1 (i.e. $S_1$), an air flow 204 inducted from the atmosphere and consisting of 774 Lbs/hr (1 lb=0.456 kg; 1 hr=3600 sec.) is compressed by the compressor 200 to 4 atm. The air temperature rises to about 410° F. (ca. 210° C.), assuming a 75% efficiency of the compressor and power consumption of 18 kW.

Starting with the induction air 204, water for vaporization in the air is added in three separate steps in this example (in other embodiments, water can be added in more or fewer steps). First, an initial water input 202 is added sometime before, during, or preferably after compression to yield, at the compressor outlet 206, a pressurized fluid stream at State 2 ($S_2$), wherein T=250° F., leading to 25 lbs. of water being evaporated into the stream. At $S_2$, the degree of saturation of the air by water, $w_s$=0.0323, the dew point, $T_s$=141° F., and the partial pressure of steam, $P_s$=2.9 psia. (1 psi=ca. 7 kPa).

After exiting the compressor 200, the moist air at $S_2$ enters a first partial pressure boiler 210 for counter flow heat exchange with the turbine exhaust 238. Before or at the entrance to the partial pressure boiler 210, a second water addition is made at 208. Heat transferred from the engine exhaust evaporates or boils about 240 lbs. of additional water into the 774 lbs. of air (plus 25 lbs of water) at 4 atm pressure, raising the air dew point from about $T_s$=139° to $T_s$=230° F., and the saturation, $w_s$, to 0.34, resulting in a total of 265 lbs. of steam present in the original 774 lbs. of compressed air at 212, (state $S_3$). The heavily moisture laden exhaust, from which heat transfer has been made, drops from about 952° F. at the inlet of the partial pressure boiler to a temperature of about 250° to 300° F., (ca. 120 to 150° C.), typically with a small amount of water condensation (State 9; location at 240).

In this example, a third steam addition is made between states $S_3$ (at 212) and $S_4$ (at 219), accompanied by heat transfer from an engine cooling loop. In the particular embodiment illustrated, this is done through direct contact transfer, under partial pressure conditions, of heat from the water cooling loop of the engine. Engine cooling water 218, which may be the primary coolant or may be a secondary loop heated by a primary coolant loop (such as, for example, a primary loop containing antifreeze), is injected into a second partial pressure boiler 214, for example by spraying, and equilibrated with the air/steam mixture 212 entering from the first boiler 210 ($S_3$). Spraying may be replaced or supplemented by other methods of mixing vapor and liquid, including passage over columns of porous materials (as in distillation), by thin film evaporation, etc. Any of the known methods and apparatus that are operable at these temperatures and pressures, and preferably ones which are physically compact, can be used.

The exiting stream at 219 ($S_4$) has acquired about 156 lbs. of additional steam, generated by evaporation as the engine coolant is cooled from 280° F. to about 260° F. The air/steam enters the engine inlet 220 at about Ts=244° F. carrying about 421 lbs. of steam. Non-evaporated coolant is returned to the engine via conduit 216. Engine cooling water (primary or secondary) is kept at a constant volume by the addition of water into the cooling loop; illustration of this step is omitted for clarity.

Note that this particular heat-mass transfer process, in addition to exhaust heat transfer, is one characteristic of this system to provide high efficiency. Here, a heat source temperature capable of producing, in a closed Rankine steam cycle, only about a one atm pressure drop through a turbine, has been used to raise the power availability to 3 atm pressure drop by the mechanism of boiling water in air—a "partial pressure" benefit. A burden is created in that the evaporated water will eventually need to be recovered from the engine exhaust using a condensing radiator. This burden is partially offset later, however, by gains in cycle power and efficiency.

At state $S_4$, the air/steam mixture 219 comprises the original 774 lb air charge at 4 atm., and now further contains over 421 lbs. steam, with saturation $w_s=0.546$, and $T_s=244°$ F. The air/steam mixture has captured a substantial portion of the engine's waste heat. This steam/air mixture 219 is now combined with the fuel, preferably at an essentially stoichiometric ratio. The fuel has also been partially reformed, as described below.

At state $S_5$, the engine receives an inlet charge of chemically correct fuel-air, with 54.6% mass dilution with steam, or with specific heat corrections, about 100% of thermal dilution—the pressure equivalent of operating an engine at 200% of stoichiometric air charge. Multiplying the fuel heating value by 1.12 (due to the effects of the endothermic reforming reaction described below) yields an equivalent $F/F_c=0.56$ (where $F/F_c$ equals the fuel-to-air ratio, F, divided by the chemically correct fuel-to-air ratio $F_c$. $F_c$ is 1 for a normally aspirated engine, but is 0.5 here because of the steam dilution.) Operation under these conditions is difficult without having hydrogen as part of the fuel charge to provide good flame front propagation. Additional benefits of the high steam content include a fuel-air cycle efficiency of approximately 47%, a steam corrected compression ratio equivalent R=8, and at most only trace levels of NOx emissions.

Peak cycle temperature $T_3$ in the combustion chamber is around 4300° R. At the end of the power stroke before exhausting and blowdown, the combustion temperature is calculated as being about 2400° R. (ca 1940° F.; ca. 1060° C.). Because the elevated exhaust pressure of 4 atm limits blowdown, the actual exhaust temperature is closer than usual to the calculated value. Exhaust manifold temperature is around 2100° R. (ca. 900° C.). The engine consumes essentially the entire stoichiometric oxygen charge, generating an additional 101 lbs of steam. The engine exhaust 222 at state $S_6$ is P=4 atm, T=2100° R. (ca. 1640° F.; ca. 900° C.), with the gas now containing 717 lbs of $CO_2$ and $N_2$ (and no significant oxygen content), 522 lbs of steam, and a saturation, $W_s$, of 0.728.

Per mole of methane or equivalent supplied, the exhaust has a molar composition of about 1 $CO_2$, 7.52 $N_2$, and 10 $H_2O$. This is five times the steam generated by normal stoichiometric combustion with no diluent. The exhaust is loaded with thermal mass and steam, and is suitable for use for turbine power and optionally for steam reforming.

In a preferred mode, between $S_6$ (222) and $S_7$ (230) about 10% of this exhaust is diverted at 228 and mixed with the incoming fuel from point 226 (which is treated as if it were $CH_4$ for simplicity of calculation). This mixture is introduced into an "exhaust reformer" 224 that is heated by thermal transfer from the remaining exhaust stream. The reaction between the exhaust and the fuel in the exhaust reformer is preferably accelerated by a reforming catalyst.

Figure 2:
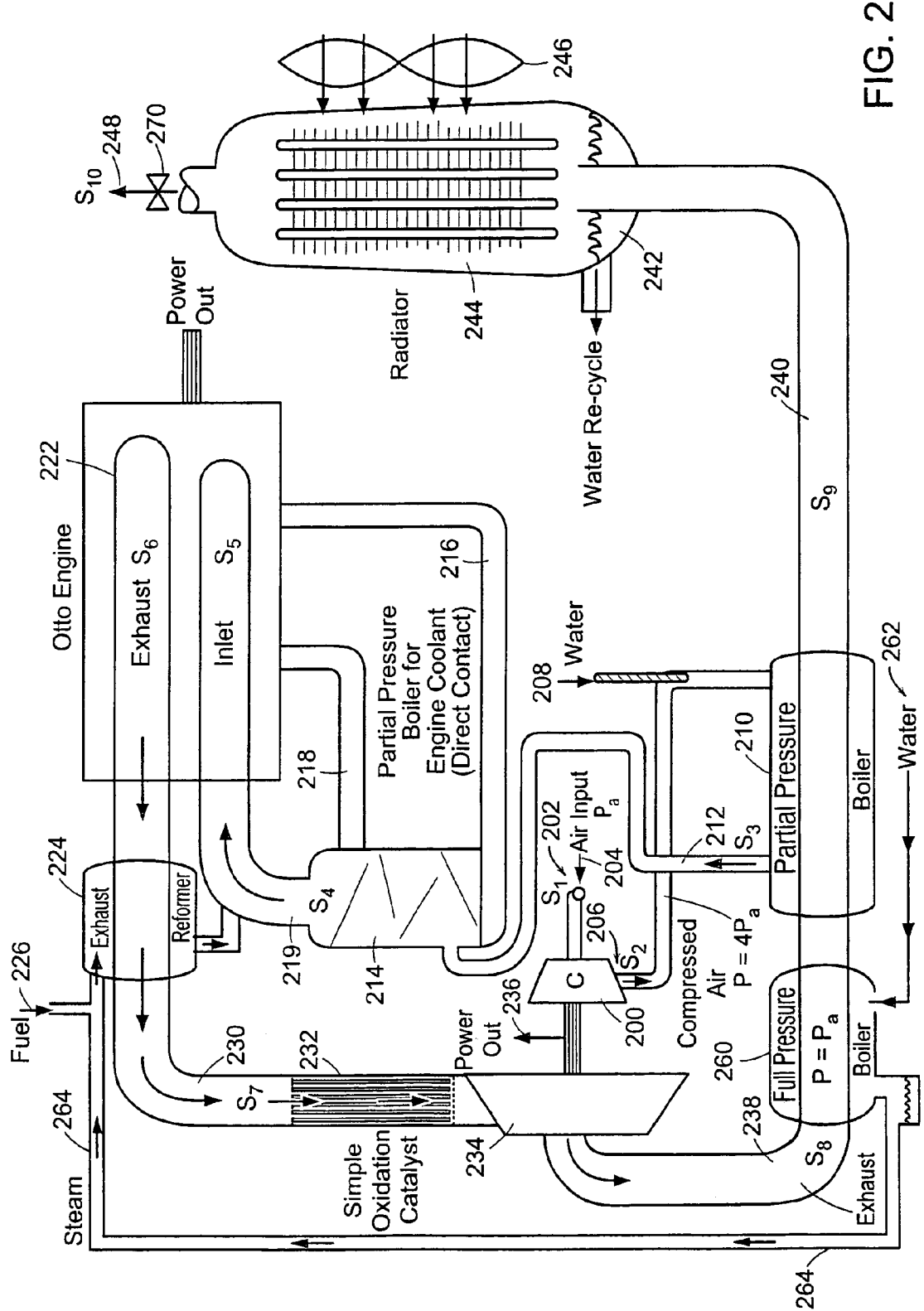
FIG. 2 is a schematic of a second embodiment of an Otto cycle engine system having a steam boiler.

In an alternative embodiment, illustrated in FIG. 2, which is otherwise identically numbered, the steam required for partial fuel reforming is supplied by a full pressure boiler 260 supplied by water from a source 262. Heat from the expanded exhaust 238 creates steam, which is conveyed through conduit 264 to mix with the fuel 226 at or near the entrance to the exhaust reformer 224.

Given a desired 50% methane slip in the reforming reaction, the overall reaction is, on a molar basis:

$1CH_4+0.1CO_2+0.752N_2+1H_2O \rightarrow 0.5CH_4+0.1CO_2+0.5CO+1.5H_2+0.5H_2O+0.752N_2$ $Q_{ch4}=344,000 BTU/Lbs$ $Q_{ref}=385,000 BTU$.

After the fuel reforming, the exhaust temperature drops by about 261° F., yielding 1380° F. at $S_7$, point 230, but the heating value of the fuel has been increased by about 12% by the endothermic conversion of methane and water (and absorbed heat) to hydrogen and carbon monoxide.

Returning to the engine, an efficiency number can now be calculated for this example. Before this, however, one more parameter should be considered. The engine, when normally aspirated (i.e., not pressurized), classically runs at 85% mechanical efficiency. The present engine operates with a dilute charge, which reduces power per unit air by about 50%. In compensation, the induction pressure may be increased to 4 atm, which increases power by about 3.7 times when corrected for manifold temperature. In addition, 12% heating value is added by reforming. So the nominal indicated power is approximately doubled with essentially the same engine friction and parasitics. Hence, an engine that would normally be rated at 50 kW can produce 114 kW, without premature detonation in the cylinders due to the suppressive effect of the steam.

From standard fuel-air cycle curves, with heating value correction, 85% cycle performance efficiency, and 90% mechanical efficiency, there is a 47%×1.12×0.85×0.9=40.2% efficiency, at this point in the cycle, compared to a 36% efficiency without the features of the partial pressure boiling cycle. The increase in efficiency is believed to be in large part due to a combination of the successful dilute combustion at pressure, the recycling of exhaust heat via reforming, and the capture of waste heat as steam. (Note that in this example, the engine efficiency has increased to 40% even before expansion of the exhaust).

The exhaust at 230, state $S_7$, optionally and preferably travels through a cleanup catalyst 232 at about 1300° F. and 4 atm for hydrocarbon emission prevention, which is still likely to be required. Note that if NOx reduction is desired, the well-known three-way catalyst commonly used in automobile applications can be used here to further reduce NOx, because the exhaust has the required chemically correct (i.e. nearly oxygen-free) constitution. This is in contrast to diesels, gas turbines, and some fuel-cell burners, which cannot use inexpensive catalysts because there is significant oxygen in the exhaust stream.

Between State $S_7$ (at 230) and state $S_8$ (at 238), an expander 234, here a turbine, expands the exhaust gas and steam charge from about 4 atm to about 1 atm at about 85% efficiency. The temperature drop is about 454° F., leaving about 952° F. as the temperature of the remaining exhaust at 238. In this example, the turbine produces an output power of 59 kW (where the turbine power is equal to the temperature drop multiplied by the sum of the (mass flow×specific heat) for each of the exhaust gases—i.e. $454_{\Delta T} \times [(123 \times 0.4)_{CO2}+(594 \times 0.24)_{N2}+(522 \times 0.5)_{H2O}]/ 0.3412_{(Conversion\ Factor)}=$ 59 kW.) This 59 kW power output more than compensates for the power required for air compression, which is about 18 kW. The turbine may optionally be used to drive the air compressor 200, and produces excess power through generator 236. Generator 236 can optionally be a motor/generator, using electric power from a battery to start up the system; or, a compressor/motor and a turbine/generator can be separate units (not illustrated), with a slight loss of efficiency.

In addition, or as an alternative to the use of a generator, the output power of the turbine can be directly added to the engine power output, such as by direct addition of the torque of the turbine to that of the engine shaft, by a spur wheel attachment, for instance.

In state S8, at point 238, the exhaust is at about T=952° F. (about 500° C.), water saturation of the gas stream $w_s$ is 522/717=0.728, and thus dew point=182° F., and pressure=1 atm. This gas enters the first partial pressure boiler 210 for heat transfer to the charge of induction air mixed with water. Recall previously that the partial pressure effect means that boiling or evaporation begins with the induction air inlet at $T_s$=about 140° F., and ends with $T_s$=228° F. With adequate heat exchange area, the steam generation quantity stated before, about 240 lbs in the induction air, is conservative considering the sensible temperature drop of the exhaust gas. In fact, exhaust gas condensing would occur with an exhaust exit temperature of even 165° F. Thus, if half the exhaust water condensed, it would add in theory twice the boiling heat flux into the induction air/water mixture that was assumed above. Hence, the above calculations are definitely conservative in terms of the amount of heat that can be recovered as steam.

Finally, at state $S_9$ the exhaust enters the condensing radiator 244, which has a fan 246, for working fluid (water) recycle. Since the system is operated at a chemically correct stoichiometry, the output temperature at the final exhaust state $S_{10}$ at 248 can be as high as 132° F. and still produce water balance, i.e., deposit enough water in the water recycle collector 242 to provide the water that is added to the compressed air at 202, 208 and 214. (The water recycling system, which will include at least one pump, and may include a water purification apparatus, is not illustrated.) If feasible, a lower exhaust exit temperature is preferred. Since the exhaust enters the radiator at $T_s$=165° F. or above, heat transfer is "wet", i.e., the radiator tubes contacting the exhaust have a coating of water, and so is high rate and non-corrosive, which favors durability of the radiator.

The final result of the partial pressure hybrid Otto cycle engine of this example is as follows:

Power=114 kW engine plus 59 kW turbine less 18 kW compressor=155 kW

Efficiency=40% (engine)×155/114=54%

Radiator Load=133.60 kW Engine Size=50 kW (standard).

It will be understood that various modifications can be made to the system described above without departing from the scope of the invention. For example, in the embodiment described above, the engine coolant water is evaporated into the pressurized air-steam stream in a separate partial pressure boiler. However, in other embodiments, the engine coolant can be boiled in the engine block itself, at saturation, so that a two-phase steam/water mixture is introduced into the already humidified air. In this way, even more evaporation can be obtained, putting more steam into the cylinders.

Also, it is important to ensure that the dew point in the exhaust is high enough to permit efficient water recovery. When ambient temperatures are low, for example 25° C. or less, then condensation of water from a 60° C. exhaust stream is easy to achieve. However, when ambient temperatures reach higher temperatures, such as 40° C., water recovery becomes more difficult. The usual solution to this problem is to size the radiator for the worst expected case of ambient temperature, but this can be awkward and expensive, especially in a mobile system. Because the system of the present invention is pressurized, an alternative approach can be used. At high ambient temperatures, a backpressure can be selectively imposed on exhaust outlet 248 by, for example, a flow-restricting variable valve 270. The backpressure raises the dew point of the exhaust stream (because the saturation volumetric concentration of water in air decreases with increasing air pressure), thus making the water in the exhaust more easily recoverable. For example, if a system is operated at 4 atmospheres, a backpressure of 0.5 atmospheres can increase the dew point by 10 to 20° C., which allows efficient recovery at higher ambient temperatures without increase of radiator size. There is a penalty for the backpressure in terms of decreased system efficiency, since there is less pressure drop through the expander. However, back pressure can be regulated to be the minimum required to recover sufficient water under ambient conditions, thus allowing the system—for example, in an automobile—to operate under various temperature and climatic conditions while maintaining the maximum efficiency possible under those conditions.

The "joint cycle" engine of the invention can be operated with or without a conventional closed-loop radiator for the engine cooling system, in addition to the condensing radiator for the engine exhaust described above. A conventional radiator may not be necessary, for instance, where a sufficient amount of the engine waste heat can be recovered by evaporation of water into pressurized air.

The above worked example uses an Otto cycle engine as a basis for improvement. Heat energy recovery is also applicable to other types of prime movers, although the efficiency gains may be smaller. For example, a similar arrangement can in principle be used in a diesel engine. The increase in efficiency would likely be smaller, because the diesel is already more efficient in terms of combustion temperatures, is typically already pressurized to some extent, and will be adversely affected in its compression by a charge containing a high level of steam. However, an efficiency benefit of recovering heat energy from the exhaust and optionally from the engine coolant by using the heat to make steam in pressurized air, and converting this heat energy to mechanical energy via an expander, is still applicable.

The invention may also be particularly advantageous when used for applications having a constant operating speed, such as a hybrid (gas/battery) car engine, and certain types of domestic co-generation systems. In these cases, the turbine can be optimized for the operating speed of the engine.

While this invention has been particularly shown and described with references to preferred embodiments thereof, it will be understood by those skilled in the art that various changes in form and details may be made therein without departing from the scope of the invention encompassed by the appended claims.

What is claimed is:

1. A combustion engine power system comprising:
  a combustion chamber which burns a fuel with a pressurized mixture of steam and air to generate useful power and waste heat, the combustion chamber producing a steam-containing exhaust stream;
a power take-off of the useful power from the combustion chamber;
a compressor in fluid communication with the combustion chamber, the compressor pressurizing air to produce a pressurized air stream;
a water supply in fluid communication with the pressurized air stream, at least a portion of the water from the supply being heated by waste heat from the power system and evaporating into the pressurized air stream to produce the pressurized mixture of air and steam;
an expander in fluid communication with the combustion chamber, the expander being driven by the steam-containing exhaust stream to produce a power output in excess of the power required to pressurize the air; and
a power take-off of the excess power from the expander.

2. The system of claim 1, wherein the power take-off from the expander is used to drive an electrical generator.

3. The system of claim 1, wherein the expander comprises a turbine.

4. The system of claim 1, wherein the waste heat which heats the water comprises waste heat from the exhaust stream.

5. The system of claim 4, wherein the waste heat from the exhaust stream heats the water after the exhaust stream drives the expander.

6. The system of claim 1, comprising multiple water supplies that are evaporated into the pressurized air, wherein at least one water supply is heated by waste heat from the exhaust stream.

7. The system of claim 1, wherein the engine comprises an Otto cycle engine.

8. The system of claim 1, wherein the engine comprises a Diesel engine.

9. The system of claim 1, wherein at least about 25% of the energy of the waste heat generated by the power system is expended in the evaporation of the water into the pressurized air.

10. The system of claim 1, wherein at least about 50% of the energy of the waste heat generated by the power system is expended in the evaporation of the water into the pressurized air.

11. The system of claim 1, wherein the steam-containing exhaust used to drive the expander comprises at least about 20% steam by weight.

12. The system of claim 1, wherein the steam-containing exhaust used to drive the expander comprises at least about 33% steam by weight.

13. The system of claim 1, wherein the output power from the expander drives the compressor.

14. The system of claim 1, wherein the compressor pressurizes the air to a pressure between about 2 and 6 atmospheres.

15. The system of claim 14, wherein the pressure is approximately 4 atmospheres.

16. A combustion engine power system comprising:
a combustion chamber which burns a fuel with a pressurized mixture of steam and air to generate useful power and waste heat, the combustion chamber producing a steam-containing exhaust stream;
a power take-off of the useful power from the combustion chamber;
a compressor in fluid communication with the combustion chamber, the compressor pressurizing air to produce a pressurized air stream;
a water supply in fluid communication with the pressurized air stream, at least a portion of the water from the source being heated by waste heat from the power system and evaporating into the pressurized air stream to produce the pressurized mixture of air and steam, wherein at least about 25% of the energy of the waste heat generated by the power system is expended in the evaporation of water into the pressurized air; and
an expander in fluid communication with the combustion chamber, the expander being driven by the steam-containing exhaust stream to produce a power output.

17. The system of claim 16, wherein at least about 50% of the energy of the waste heat generated by the power system is expended in the evaporation of water into pressurized air.

18. A combustion engine power system comprising:
a combustion chamber which burns a fuel with a pressurized mixture of steam and air to generate useful power and waste heat, the combustion chamber producing a steam-containing exhaust stream;
a power take-off of the useful power from the combustion chamber;
a compressor in fluid communication with the combustion chamber, the compressor pressurizing air to produce a pressurized air stream;
a water supply in fluid communication with the pressurized air stream, at least a portion of the water from the source being heated by waste heat from the power system and evaporating into the pressurized air stream to produce the pressurized mixture of air and steam; and
an expander in fluid communication with the combustion chamber, the expander being driven by the steam-containing exhaust stream to produce a power output, the steam-containing exhaust comprising at least about 20% steam by weight.

19. The system of claim 18, wherein the steam-containing exhaust comprises at least about 33% steam by weight.

20. A method of operating a combustion engine power system comprising:
compressing air to provide a pressurized air stream;
evaporating water into the pressurized air stream, using waste heat from the power system, to produce a pressurized steam-air mixture;
burning fuel with the pressurized steam-air mixture in a combustion chamber to produce useful power and waste heat, the burning also producing a steam-containing exhaust stream;
taking-off useful power from the combustion chamber;
expanding the steam-containing exhaust stream through an expander to produce an output power in excess of the power required to provide the pressurized air stream; and
taking-off excess power from the expander.

21. The method of claim 20, wherein taking-off excess power from the expander comprises using the power to drive an electrical generator.

22. The method of claim 20, wherein the waste heat comprises waste heat from the exhaust stream.

23. The method of claim 20, wherein the waste heat is transferred from the exhaust stream after the exhaust has expanded in the expander.

24. The method of claim 20, wherein at least about 25% of the energy of the waste heat generated by the power system is expended in the evaporation of water into the pressurized air.

25. The method of claim 20, wherein at least about 50% of the energy of the waste heat generated by the power system is expended in the evaporation of water into the pressurized air.

26. The method of claim 20, wherein the steam-containing exhaust used to expand the expander comprises at least about 20% steam by weight.

27. The method of claim 20, wherein the steam-containing exhaust used to expand the expander comprises at least about 33% steam by weight.

28. The method of claim 20, wherein the expander power is used to compress the air.

29. The method of claim 20, wherein the air is compressed to a pressure between about 2 and 6 atmospheres.

30. The method of claim 29, wherein the air pressure is about 4 atmospheres.

31. A method of operating a combustion engine power system comprising:
   compressing air to provide a pressurized air stream;
   evaporating water into the pressurized air stream, using waste heat from the power system, to produce a pressurized steam-air mixture; wherein at least about 25% of the energy of the waste heat generated by the power system is expended in the evaporation of water into the pressurized air;
   burning fuel with the pressurized steam-air mixture in a combustion chamber to produce useful power and waste heat, the burning also producing a steam-containing exhaust stream;
   taking-off useful power from the combustion chamber; and
   expanding the steam-containing exhaust stream through an expander to produce additional power.

32. A method of operating a combustion engine power system comprising:
   compressing air to provide a pressurized air stream;
   evaporating water into the pressurized air stream, using waste heat from the power system, to produce a pressurized steam-air mixture;
   burning fuel with the pressurized steam-air mixture in a combustion chamber to produce useful power and waste heat, the burning also producing a steam-containing exhaust stream comprising at least about 20% steam by weight;
   taking-off useful power from the combustion chamber; and
   expanding the steam-containing exhaust stream through an expander to produce additional power.

* * * * *